US007670568B2

(12) United States Patent
Ginosar et al.

(10) Patent No.: US 7,670,568 B2
(45) Date of Patent: Mar. 2, 2010

(54) SYSTEM FOR REACTIVATING CATALYSTS

(75) Inventors: Daniel M. Ginosar, Idaho Falls, ID (US); David N. Thompson, Idaho Falls, ID (US); Raymond P. Anderson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 12/165,301

(22) Filed: Jun. 30, 2008

(65) Prior Publication Data

US 2008/0267835 A1    Oct. 30, 2008

Related U.S. Application Data

(60) Division of application No. 10/613,719, filed on Jul. 3, 2003, now Pat. No. 7,407,905, which is a continuation-in-part of application No. 10/412,806, filed on Apr. 9, 2003, now Pat. No. 6,887,813, which is a continuation of application No. 09/593,186, filed on Jun. 14, 2000, now Pat. No. 6,579,821.

(51) Int. Cl.
    F27B 15/08       (2006.01)
(52) U.S. Cl. .................. 422/144; 422/178; 422/223
(58) Field of Classification Search ................ 422/144, 422/178, 223; 502/22, 24, 29, 31
    See application file for complete search history.

(56) References Cited

U.S. PATENT DOCUMENTS

| | | | |
|---|---|---|---|
| 3,725,299 | A | 4/1973 | Turnock et al. |
| 4,058,575 | A | 11/1977 | Cahn et al. |
| 4,124,528 | A | 11/1978 | Modell |
| 4,605,811 | A | 8/1986 | Tiltscher et al. |
| 4,721,826 | A | 1/1988 | Tiltscher et al. |
| 4,956,518 | A | 9/1990 | Child et al. |
| 4,982,043 | A | 1/1991 | Hasselbring |
| 5,177,298 | A | 1/1993 | Yon et al. |
| 5,304,698 | A | 4/1994 | Husain |
| 5,310,713 | A | 5/1994 | Kojima et al. |
| 5,326,923 | A | 7/1994 | Cooper et al. |
| 5,345,028 | A | 9/1994 | Alerasool |
| 5,489,732 | A | 2/1996 | Zhang et al. |
| 5,491,277 | A | 2/1996 | Stine et al. |
| 5,712,213 | A | 1/1998 | Joly et al. |
| 5,907,075 | A | 5/1999 | Subramaniam et al. |
| 5,916,835 | A | 6/1999 | Carroll et al. |
| 6,103,948 | A | 8/2000 | Ginosar et al. |
| 6,579,821 | B1 | 6/2003 | Ginosar et al. |
| 6,610,624 | B2 | 8/2003 | Horhota et al. |

FOREIGN PATENT DOCUMENTS

| | | |
|---|---|---|
| CA | 2273333 | 6/1998 |
| EP | 0 680 941 A1 | 11/1995 |

OTHER PUBLICATIONS

Written Opinion of the International Searching Authority from PCT/US05/40546, dated Jun. 3, 2008, 7 pages.
European Patent Office Supplementary European Search Report, Aug. 11, 2004.
Fan, L. et al., Supercritical-Phase Alkylation Reaction on Solid Acid Catalysts: Mechanistic Study and Catalyst Development, Ind. Eng. Chem. Res., vol. 36, 1997, pp. 1458-1463, XP002292033.
Hammershaimb, H.U. et al., "Alkylation," Encyclopedia of chemical Technology, 4th Edition, vol. 2, pp. 85-112, no date.
Inui et al., "Effect of Modification of Acid Sites Located on the External Surface of a Gallium-Silicate Crystalline Catalyst on Reducing Coke Deposit in Paraffin Aromatization," Ind. Eng. Chem. Res. 1997, 36, 4827-4831.
J.A. Martens, et al., Estimation of the void structure and pore dimensions of molecular sieve zeolites using the hydroconversion of n decane, Zeolites 4, 98 (1984).
Kirk Othmer Encyclopedia of Chemical Technology, vol. 21, pp. 770-800, 3rd ed. (1983).
"Material Safety Data Sheet, Benzene MSDS," Science Lab.com, accessed Jan. 19, 2008, pp. 1-8.
"Material Safety Data Sheet, Isobutylene," Airgas, accessed Jan. 19, 2008, pp. 1-5.
Meier et al., "Atlas of Zeolite Structure Types," 2nd Rev Ed., Butterworths, 1987, pp. 1-152.
Petkovic et al., "Characterization of Coke Deposited on USY Zeolite Catalyst Under Isobutane/butane Alkylation Reaction and Supercritical Isobutane Regeneration," 18th Annual Symposium of the Western States Catalysis Club, Feb. 27, 2004, 25 pages.
Petkovic et al., "The effect of supercritical isobutane regeneration on the nature of hydrocarbons deposited on a USY zeolite catalyst utilized for isobutane/butane alkylation," Applied Catalysis A: General xxx (2004) xxx-xxx.
S.M. Csicsery, Catalysis by shape selective zeolites Science and technology, Pure & Appl. Chem. 58(6), 841(1986).
Seapan, M. et al., Chapter 9 Decoking and Regeneration of a Hydrotreating Catalyst by Supercritical Extraction, 1989, American Chemical Society.
W. Hölderich, et al., Industrial application of zeolite catalysts in petrochemical processes, Ger. Chem. Eng. 8, 337 (1985).
W. Hölderich, et al., Zeolites: Catalysts for organic syntheses, Angew. Chem. Int. Ed. Engl. 27, 226 (1988).
Zhao, Dongbin et al., "Ionic Liquids: Applications in Catalysis," Catalysis Today 74 (2002) 157-189.
Zurer, P., Green Organic Synthesis Dives into Near-Critical Water, C&EN, Jan. 3, 2000, pp. 26-27.

*Primary Examiner*—Edward M Johnson
(74) *Attorney, Agent, or Firm*—TraskBritt

(57) ABSTRACT

A method of reactivating a catalyst, such as a solid catalyst or a liquid catalyst is provided. The method comprises providing a catalyst that is at least partially deactivated by fouling agents. The catalyst is contacted with a fluid reactivating agent that is at or above a critical point of the fluid reactivating agent and is of sufficient density to dissolve impurities. The fluid reactivating agent reacts with at least one fouling agent, releasing the at least one fouling agent from the catalyst. The at least one fouling agent becomes dissolved in the fluid reactivating agent and is subsequently separated or removed from the fluid reactivating agent so that the fluid reactivating agent may be reused. A system for reactivating a catalyst is also disclosed.

14 Claims, 3 Drawing Sheets

SYSTEM FOR REACTIVATING CATALYSTS

CROSS-REFERENCE TO RELATED APPLICATIONS

This application is a divisional of application Ser. No. 10/613,719, filed Jul. 3, 2003, now U.S. Pat. No. 7,407,905, issued Aug. 5, 2008, which is a continuation-in-part of U.S. patent application Ser. No. 10/412,806, filed on Apr. 9, 2003, now U.S. Pat. No. 6,887,813, issued May 3, 2005, which is a continuation of U.S. patent application Ser. No. 09/593,186 filed on Jun. 14, 2000, issued Jun. 17, 2003, as U.S. Pat. No. 6,579,821, the disclosure of each of the foregoing is hereby incorporated by reference.

GOVERNMENT RIGHTS

This invention was made with government support under Contract No. DE-AC07-99ID13727 and Contract No. DE-AC07-05ID14517 awarded by the U.S. Department of Energy. The government has certain rights in the invention.

BACKGROUND OF THE INVENTION

1. Field of the Invention

The present invention relates to reactivating a catalyst that is contaminated with fouling agents. More specifically, the present invention relates to reactivating the catalyst that is used in an alkylation reaction or other catalytic reaction. In addition, the present invention relates to recycling a fluid reactivating agent used to reactivate the catalyst.

2. State of the Art

As conventionally accepted in the literature on alkylation, terms such as "alkanes," "paraffins" and "paraffinic hydrocarbons" will hereinafter refer to open-chain saturated hydrocarbons. The suffix "-ene" is adopted for straight-chain monounsaturated hydrocarbons, so that a term such as "butene" refers to at least one of the compounds 1-butene and 2-butene. The suffix "-ylene" is hereinafter employed to refer to a monounsaturated hydrocarbon that consists of the same number of carbon atoms as expressed by the name; for example, the term "butylene" refers to at least one of the compounds 1-butene, 2-butene, and isobutylene, the latter compound also is known as 2-methylpropene. Terms such as "alkenes," "olefins" and "olefinic hydrocarbons" generically refer to monounsaturated hydrocarbons.

The prefix iso- is generically used to refer to branched alkanes or alkenes that have one or more methyl groups only as side chains. Aromatic hydrocarbons refer to hydrocarbons that have at least one aromatic ring and to hydrocarbons which, although strictly not aromatic, contain conjugation to the extent such that they undergo alkylation reactions like aromatic compounds.

The term $C_n$ describes a hydrocarbon with n carbon atoms, whether the hydrocarbon is linear, branched, paraffinic, olefinic or aromatic. The notation $C_n$-$C_m$ describes at least one hydrocarbon in the set of hydrocarbons such that the number of carbon atoms ranges from n to m for any individual hydrocarbon in the set. The notation $C_{n \geq p}$ or $C_{p+}$ refers to at least one hydrocarbon with at least p carbon atoms, and it often refers to a mixture of hydrocarbons such that the number of carbon atoms is at least p for any individual hydrocarbon in the mixture.

The term alkylation generically refers to the addition of an alkyl group to a molecule that is to be alkylated. Alkylation of alkenes to produce alkylation products, or alkylate, is an addition of a saturated hydrocarbon (R—H) to an alkene to yield a saturated hydrocarbon of higher molar mass. This reaction is generically represented by the following chemical equation:

Equation (1)

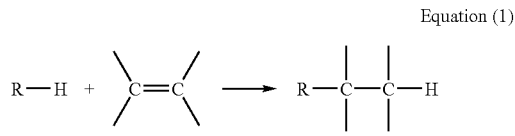

Alkylation is extensively used in the petroleum industry to produce medium- or large-mass hydrocarbons from smaller molecules. One of the more important alkylation reactions is the addition of isobutane to 2-butene to produce 2,2,4-trimethylpentane according to the following equation:

Equation (2)

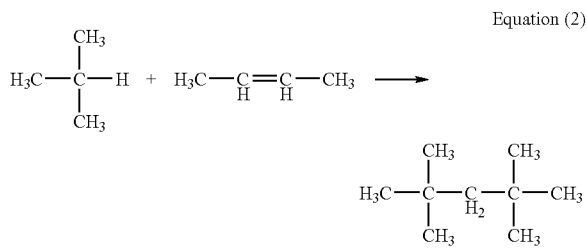

This reaction is conventionally carried out in the presence of an acid such as sulfuric acid or anhydrous hydrofluoric acid.

According to the nomenclature previously introduced, the first reactant in Equation (1) is an alkane, paraffin or paraffinic hydrocarbon, whereas the second reactant in the same equation is an alkene, olefin, or olefinic hydrocarbon that can also correspond in that equation with an alkylene. More specifically, the paraffin which is listed as the first reactant in Equation (2) is isobutane, and the alkylene which is listed as the second reactant in the same equation is 2-butene. Furthermore, Equations (1) and (2) describe with varying degrees of generality paraffin alkylation, or the addition reaction of a paraffin and an olefin. Equation (2), in particular, describes the addition reaction of an isoparaffin and an olefin where the alkylate is an isoalkane.

The notation used in Equation (1) describes a reaction that includes, for example, the reaction of a $C_4$-$C_8$ paraffinic hydrocarbon with a $C_2$-$C_{12}$ olefinic hydrocarbon to produce a branched paraffinic hydrocarbon. In the particular example provided by Equation (2), a $C_4$ isoparaffin reacts with a $C_4$ olefin to produce a $C_8$ isoparaffin.

As indicated above, aromatic hydrocarbons can also be alkylated. For example, benzene can be alkylated with ethylene to produce ethylbenzene, a precursor of styrene, according to the zeolite catalyzed reaction that is described by the following equation:

Equation (3)

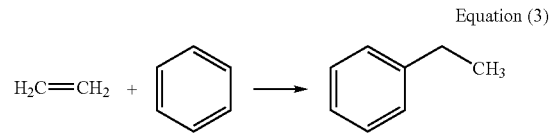

Ethylbenzene yields, upon dehydrogenation, styrene, which is the simplest and most important member of a series of unsaturated aromatic compounds. The zeolite-catalyzed alkylation of benzene by ethylene has been described in a number of sources. See, for example, Kirk-Othmer Encyclopedia of Chemical Technology, Vol. 21, pp. 770-800, 3rd ed. (1983).

The olefins in Equations (1)-(3) are the respective alkylating agents. Generally, in alkylation reactions, the amount of the reactant to be alkylated exceeds the amount of the alkylating agent. Thus, when an aromatic hydrocarbon is alkylated with an olefin, it is preferred to operate with a molar ratio of the aromatic hydrocarbon to the olefin greater than 1:1, and preferably from about 2:1 to 5:1 as measured by the flow rates into the reaction zone. Similarly, it is preferable to operate with a paraffin-to-olefin molar ratio greater than 2:1. Preferably, the paraffin-to-olefin molar ratio exceeds 3:1. However, ratios as high as 100:1 can be employed. The use of a large-pore zeolite with a Lewis acid reportedly increases the activity and selectivity of the zeolite, thus permitting effective alkylation at high olefin weight hour space velocity (OWHSV) and low isoparaffin/olefin ratio. The OWHSV is defined as the amount of olefin fed to the reactor per unit catalyst per hour (i.e., g olefin (g catalyst)$^{-1}$ h$^{-1}$).

The principal industrial application of paraffin alkylation is in the production of premium-quality fuels for internal combustion engines. More specifically, alkylation is mainly used to provide a high octane blending alkylate for automotive fuels that also increases the fuel sensitivity to octane-enhancing agents. Alkylate components are typically characterized by clean, low emission burning. Because of these properties, alkylate production capacity is expected to increase as specifications for gasoline become more stringent.

Most commercial alkylations rely on catalytic processes for the production of alkylate. Catalysts used in industrial alkylations have typically been strong liquid acids, such as sulfuric acid and hydrofluoric acid. Other strong acids have been used in laboratory or industrial alkylations. These acids include aluminum trichloride, and super acids such as trifluoromethanesulfonic acid.

In addition to problems related to undesired polymerization and side-reactions, liquid acid alkylation requires the use of a fairly concentrated acid and the replacement of consumed acid. For example, sulfuric acid concentration is controlled above 90% to provide optimum activity and selectivity, and hydrofluoric acid concentration is maintained in the range of 85-95%. These acids, however, are recognized hazardous materials, the use of which requires the adoption of periodic hazard reviews of the operating units and the implementation of safety procedures and measures to minimize the probability of accidental releases. Other typically costly measures that must be adopted include control operations to mitigate the detrimental effects of any such possible accidents.

Another drawback of the use of liquid acid catalysts is the disposal of sludge formed during alkylation. This waste sludge that is produced by sulfuric acid or hydrofluoric acid catalyzed alkylations is subject to stringent environmental regulations. The regulated waste management operations for the disposal of this sludge add considerable expenses to commercial alkylation.

The residue known as "red oil" is another product derived from liquid acid catalysis that presents disposal and recycling problems. Red oil is predominantly the conjugation product of an acid and alkylate that has to be disposed of, or recycled. Disposal presents a problem that is inherent in the storage, handling and deposit of hazardous substances. Further, recycling is also an expensive operation because it requires the implementation of additional processes that significantly increase the cost of producing the desired alkylate.

The handling and disposal problems associated with liquid acid alkylation catalysts cause technological developments in alkylations to be greatly influenced by environmental considerations. One reason is that modern low emission gasoline formulations rely heavily on alkylate. Furthermore, as noted in the foregoing discussion, the use of liquid acid alkylation catalysts requires a constant improvement of process safety, the reduction of waste disposal, and the limitation of the environmental consequences of any process emissions. In addition, liquid acid catalysis employing sulfuric acid or hydrofluoric acid is not an effective means for catalyzing certain alkylations, such as the alkylation of benzene with ethylene.

It is therefore desirable to provide alkylation catalysts that can be used in the production of low emission fuels, that are noncorrosive and easy to handle, and that can be effectively reactivated to avoid disposal problems. Because solid acid catalysts are easier to handle and less hazardous than liquid acid catalysts, they are good candidates to replace liquid acid alkylation catalysts. However, solid catalysts are known to deactivate relatively rapidly as a consequence of fouling of the active sites by heavy reaction intermediate products and byproducts. This is considered a major hurdle for the effective use of solid acid alkylation catalysis. See Kirk-Othmer, Encyclopedia of Chemical Technology, Vol. 2, p. 92, 4th ed. (1991). Rapid deactivation of solid acid catalysts leads to relatively large volumes of material that must be discarded. Disposal of such material introduces a host of complications, such as environmental issues and the like. See id., p. 108. Consequently, it is particularly desirable to provide solid acid alkylation catalysts which can be handled easily, and which can easily be reactivated to an active condition so that they can be used effectively in further alkylation reactions.

Because alkylation reactions typically take place in a fluid medium, the use of solid acid catalysts is also referred to as heterogeneous catalysis.

The term "catalyst" as used herein as applied to catalysts suitable for use with the present invention includes any solid or liquid catalyst with sufficient strength to carry out the desired reaction, such as an alkylation reaction or other desired reaction. The solid catalyst may include an acid or a base functionality. A large number of catalysts for use in alkylation and other reactions have been proposed, including molecular sieves, and in particular zeolites, silicates, aluminophosphates, and silicoaluminophosphates. The catalysts can be chosen from among a variety of substances, with the specific catalyst often determined by the character of the processes carried out in the plant where the reaction takes place.

Zeolites, which can be natural, synthetic or mixtures thereof used as catalysts in alkylation or other reactions, include ZSM-4, ZSM-3, ZSM-5, ZSM-20, ZSM-18, ZSM-12, ZSM-35, ZSM-48, ZSM-50, MCM-22, PSH-3, TMA offretite, TEA mordenite, REY, faujasites comprising zeolite Y and mordenite, ultrastable Y zeolites (USY), and a number of zeolites such as zeolite beta, zeolite Omega, zeolite L, and clinoptilolite, and rare-earth metal containing forms of zeolites. Other catalysts include at least one among a variety of inorganic oxides such as alumina, and in particular η or γ alumina, silica, boria, phosphorous oxides, titanium dioxide, zirconium dioxide, chromia, zinc oxide, magnesia, calcium oxide, silica-alumina, silica-magnesia, silica-alumina-magnesia, silica-alumina-zirconia, sulfated mixed-metal oxides, and more generally a variety of refractory inorganic oxides and natural substances such as bauxite, clay, including kaolin and bentonite, and diatomaceous earth. Molecular sieves that also catalyze alkylations include pillared silicates and/or clays, aluminophosphates such as ALPO-5 and VPI-5; silicoaluminophosphates such as SAPO-5, SAPO-37, SAPO-31, SAPO-40, and SAPO-41, other metal aluminophosphates, and layered materials such as MCM-36. These catalysts, alone or in combination among themselves or with other substances, are known to be used in alkylations of olefins and aromatic hydrocarbons. For example, one of the non-zeolitic substances that can be combined with zeolites in the preparation of alkylation catalysts is at least one Lewis acid, such as boron trifluoride, antimony pentafluoride, and aluminum trichloride. Refractory oxides can be used in combination with other catalytic substances to provide temperature resistance. In addition, diluent materials such as various oxides and clays can be incorporated to control the conversion rate, to improve the catalyst's mechanical properties, to provide a matrix material, and/or to act as catalyst binders. Other active substances, for example platinum and/or palladium, can also be incorporated into alkylation catalysts to provide a metal hydrogenation function. Other catalysts capable of catalyzing alkylation can be produced by the deposition of agents covalently bound to, or entrained in, polymers on a solid surface not generally capable or poorly capable of catalyzing alkylation.

Various references that provide guidance in the composition, preparation/obtention and use of such catalysts are known. In this respect, reference in made to U.S. Pat. Nos. 5,491,277; 5,489,732; 5,345,028; and 5,304,698. The disclosure of each of these patents is incorporated by reference herein.

Solid alkylation catalysts affect alkylation kinetics. However, an alkylation catalyst does not effectively modify alkylation kinetics when at least one of a variety of conditions is satisfied. For example, an alkylation catalyst is not effective when, despite being in the presence of the alkylation reactants at the appropriate thermodynamic reaction conditions, the catalyst is deactivated. In another example, an alkylation catalyst does not effectively modify alkylation kinetics when the catalyst is under conditions such that not all of the alkylation reactants are available. Conditions in which not all of the alkylation reactants are present for the alkylation to take place will hereinafter be referred to as "the absence of alkylation."

Reactants, intermediate reaction species, and alkylates of a variety of sizes and shapes can participate in a variety of alkylations. The shape and size selectivity of the zeolite is directly related to the shape and size of the channels in the zeolite. Accordingly, selection of the appropriate zeolite for any given alkylation will be determined by its structural characteristics. Structure, dimensions and pore characteristics of zeolites are provided in numerous sources, such as J. A. Martens, et al., Estimation of the void structure and pore dimensions of molecular sieve zeolites using the hydroconversion of n-decane, Zeolites 4, 98 (1984); W. Hölderich, et al., Industrial application of zeolite catalysts in petrochemical processes, Ger. Chem. Eng. 8, 337 (1985); W. Hölderich, et al., Zeolites: Catalysts for organic syntheses, Angew. Chem. Int. Ed. Engl. 27, 226 (1988); S. M. Csicsery, Catalysis by shape selective zeolites—Science and technology, *Pure & Appl. Chem.* 58(6), 841 (1986); W. Meier, et al., Atlas of zeolite structure types (1988). For example, zeolite A, erionite, and chabazite are classified as small-pore zeolites; medium-pore zeolites include zeolites ZSM-5, ZSM-11, ZSM-22, ZSM-23, ZSM-48, NU-10, Theta 1, TS-1, and sihealite; and large-pore zeolites comprise faujasite, X-zeolite, Y-zeolite, mordenite, offretite, zeolite L, zeolite Omega, zeolites ZSM-4, ZSM-12, and zeolite Z.

Although the availability and properties of a variety of alkylation catalysts for heterogeneous catalysis have been known for some time, the deactivation of most of these catalysts remains a problem. A number of attempts to solve or ameliorate aspects of the catalyst deactivation problem have been made.

U.S. Pat. Nos. 4,605,811 (hereinafter "the '811 patent") and 4,721,826 (hereinafter "the '826 patent") disclose a process for restoring or maintaining the activity of heterogeneous catalysts for reactions at normal and low pressures. Catalyst activity is restored or maintained by using a pressure greater than the critical pressure of the fluid phase and a temperature higher than or equal to the critical temperature of the fluid phase. The process disclosed in these patents includes the reactivation of the catalyst at a pressure and temperature that are in the supercritical region of the reaction medium phase diagram. This requirement limits the range of substances that can be chosen to regenerate the catalyst, because the critical pressure and temperature must be within the pressure and temperature ranges for which the reaction conditions have been optimized, otherwise the reaction would proceed less efficiently or it would even not take place significantly. Furthermore, the substance that regenerates the catalyst must be compatible with the reactants and products because reactivation takes place while the chemical reaction proceeds. Reported times for catalyst reactivation according to the processes disclosed in the '811 and the '826 patents include 24 hours and 75 hours.

U.S. Pat. No. 5,304,698 (hereinafter "the '698 patent") discloses a solid catalyzed supercritical isoparaffin-olefin alkylation process. The alkylation conversion conditions of this process include temperature and pressure that are, respectively, at least equal to the critical temperature and critical pressure of the component of highest concentration in the feed stock. These conditions are maintained over the entire course of the reaction until the catalyst is completely deactivated. The '698 patent does not disclose how to regenerate a completely deactivated catalyst. Furthermore, the isoparaffin containing feed is not to be contacted with the catalyst according to the process disclosed in the '698 patent under pressure and temperature conditions below the critical temperature and critical pressure of the isoparaffin component of highest concentration in the feed. The '698 patent teaches the use of conditions under which the component of highest concentration in the feed, being kept under supercritical conditions, prolongs the useful catalytic life of the crystalline microporous material through properties and behavior attributed to such component under supercritical conditions.

U.S. Pat. No. 5,310,713 discloses a process for regeneration of an alkylation catalyst with hydrogen. This process requires reactivation with hydrogen gas that can be mixed with liquid isobutane as a solvent. U.S. Pat. No. 5,491,277 (hereinafter "the '277 patent") discloses a mixed-phase solid bed hydrocarbon alkylation process where "the exact manner of regeneration does not form . . . [part of] the process but is expected to include 'washing' of the catalyst with a liquid phase hydrocarbon such as isobutane or benzene, possibly at an elevated temperature and in the presence of some hydrogen to remove carbonaceous deposits." Col. 6, 11. 28-33. The regeneration procedure disclosed in the '277 patent requires the presence of hydrogen with liquid isobutane that is supplied at a temperature of 100-150° C. as a solvent.

U.S. Pat. No. 5,489,732 discloses a fluidized solid bed motor fuel alkylation process in which the solid acid catalyst is continuously regenerated by removing it from the reactor and contacting it with hydrogen. In the first regeneration step, the hydrogen is dissolved in feed hydrocarbon and the catalyst is mildly regenerated. In the second regeneration step, the catalyst is separated from the liquid phase and regenerated with gaseous hydrogen at a temperature in the range 80-500° C. (preferably 100-250° C.). The regenerated catalyst is then fluidized with 38° C. isobutane and reintroduced to the bottom of the reactor. The average residence time of the regenerating catalyst in the liquid-phase hydrocarbon zone is 0.5-15 min, and the temperature and pressure in this zone are very near the reaction conditions for the alkylation.

The patents and other publications cited hereinabove are each incorporated herein by reference in their entirety.

The term "catalyst reactivation" will hereinafter be used to encompass catalyst regeneration and also catalyst reactivation. Catalyst reactivation refers to the treatment of a catalyst that renders it into a form in which it is suitable for its efficient use or re-use as a catalyst. "Reactivating agent" will hereinafter refer to a substance or mixture of substances that is used in catalyst reactivation.

The foregoing discussion indicates that it is highly desirable to provide heterogeneous catalysis that effectively replaces liquid acid catalysis in alkylation reactions. However, solid acid catalysts present problems associated with the catalyst's longevity and alkylate product quality.

Fouling substances that are generated in the alkylation process or that are introduced with the feed in the alkylation process fairly quickly reduce the number of the catalyst's active sites. Catalytic site reduction leads in turn to a reduction of the alkylation efficiency to a point such that the alkylation no longer takes place to any significant extent. Deactivated catalyst disposal would impose heavy burdens, such as those associated with waste disposal regulation compliance and the costs of resupplying the spent catalyst.

Methods employing supercritical fluids that are directed to the extension of the useful life of catalysts have not addressed the need to reactivate catalysts that have become deactivated. Furthermore, proposed methods for prolonging the longevity of alkylation catalysts rely on the maintenance of supercritical temperature and pressure conditions throughout the alkylation. This is a requirement that imposes a variety of limitations on the alkylation process, including a limited choice of reactivating agents and the possibly inefficient running of the alkylation.

According to one alkylation strategy, the temperature and pressure of alkylation conditions must be within narrow limits to procure the optimal thermodynamic and kinetic conditions and to avoid undesired byproducts and additional fouling agents. In those cases at least, the choices for the reactivating agent are typically very limited. Furthermore, only a very reduced number of substances that do not actually participate in the alkylation itself may have a critical pressure and a critical temperature that fall within the optimal pressure and temperature reaction conditions.

According to another strategy, the alkylation is run at a temperature and pressure high enough that they are within the supercritical conditions of at least one of the reactants. This reactant is then assigned the function of removing fouling agents and thus prolonging the longevity of the catalyst as an effective alkylation catalyst. However, the required critical pressure and critical temperature might be so high that they are detrimental to the alkylate quality. For example, such temperature and/or pressure conditions may favor undesirable side reactions, such as isomerizations, product cracking, olefin oligomerization, and coking, which might predominate over the desired alkylation. Product quality and high octane product yield are then significantly reduced. In addition, some of the undesired side reactions might contribute to the additional build up of fouling agents, thus aggravating the problem that was to be solved.

According to still another strategy, the alkylation catalyst is transferred out of the reactor for its total or partial reactivation. Reactivation is then accomplished by processes such as calcination, treatment with solvents, and elution with substances that dissolve and/or react with the fouling agents. The implementation of this strategy requires the substantial modification of reactor equipment or the complete removal and replacement of catalyst batches.

It would thus be desirable to provide a catalyst reactivation process that can rely on a substance that contains at least one of the alkylation reactants as reactivating agent, or some other substance that can be used as reactivating agent without detrimentally affecting the alkylation itself.

It would also be desirable to provide a catalyst reactivation process that can be carried out independently of the alkylation itself to reactivate a partially or totally deactivated catalyst under conditions such that the alkylation itself is not detrimentally affected. Furthermore, it would be desirable to provide a catalyst reactivation process that can effectively reactivate the catalyst regardless of the optimal pressure and temperature conditions at which the alkylation is run.

Such a reactivation process should rely on a reactivating agent that removes fouling agents by reacting with and dissolving them. In this way, the process' reactivating ability is considerably enhanced with respect to the reactivating ability of those processes that rely on the mere dissolution of certain fouling agents in the medium that extends the catalyst's useful life.

Further, it would be desirable to reactivate solid catalysts that are used to catalyze additional types of reactions, such as nonalkylation or other catalytic reactions. It would also be desirable to recycle or reuse the reactivating agent to reduce the costs associated with the regeneration process.

BRIEF SUMMARY OF THE INVENTION

The present invention relates to a method of reactivating a catalyst, such as a solid catalyst or a liquid catalyst. The method comprises providing a catalyst that is at least partially deactivated in use by one or more fouling agents that may be hydrogen deficient. The catalyst may be used to catalyze an alkylation reaction, a transesterification reaction, an esterification reaction, an oligomerization reaction, a polymerization reaction, or an isomerization reaction. The reaction catalyzed by the catalyst is referred to herein as the "primary reaction." The catalyst is contacted with a fluid reactivating agent that is at or above a critical point of the fluid reactivating agent and is of sufficient density to dissolve impurities. The fluid reactivating agent may comprise an alkane having at least one tertiary carbon atom or a compound that can be isomerized in the presence of the catalyst to form at least one tertiary carbon atom. The fluid reactivating agent reacts with and transfers a hydride ion to at least one fouling agent, which is subsequently released from the catalyst.

The at least one fouling agent may be removed from the fluid reactivating agent so that the fluid reactivating agent may be recycled or reused. The at least one fouling agent may be separated from the fluid reactivating agent by adsorbing the at least one fouling agent to a solid material, precipitating the at least one fouling agent from the fluid reactivating agent, or chemically reacting the at least one fouling agent with a recycling catalyst. The fluid reactivating agent may be reused as a fluid reactivating agent or, in certain circumstances, as a constituent of the feed mix.

The present invention also relates to a method of reactivating a catalyst. The method comprises directing a fluid reactivating agent towards at least one catalyst that is at least partially deactivated by fouling agents, the at least one catalyst located in at least one reactor. A first pumping device may be used to direct the fluid reactivating agent towards at least one catalyst. The at least one catalyst is contacted with the fluid reactivating agent that is at or above a critical point of the fluid reactivating agent and is of sufficient density to dissolve impurities. The fluid reactivating agent is reacted with at least one fouling agent to form a contaminated fluid reactivating agent comprising the at least one fouling agent. The contaminated fluid reactivating agent may be directed to a reactivating agent recovery through a second pumping device. The at least one fouling agent is removed from the fluid reactivating agent and the fluid reactivating agent may be recycled. A third pumping device may be used to effect the recycling.

The present invention also relates to a system for reactivating a catalyst. The system may comprise at least one reactor for holding at least one catalyst that is at least partially deactivated by fouling agents. A first pumping device may be configured and operably coupled to direct a fluid reactivating agent that is capable of reacting with impurities from a source toward the at least one catalyst. The impurities comprise at least one fouling agent and products of a reaction of the fluid reactivating agent with the at least one fouling agent. Pressure and temperature control devices may be configured to implement desired pressure and temperature conditions while the catalyst is in contact with the fluid reactivating agent so that the fluid reactivating agent is at or above a critical point of the fluid reactivating agent and is of sufficient density to dissolve the impurities. A second pumping device may be configured and operably coupled to direct contaminated fluid reactivating agent to a reactivating agent recovery, the contaminated fluid reactivating agent including the fluid reactivating agent and at least one fouling agent. A third, optional pumping device may be configured and operably coupled to direct clean fluid reactivating agent from the reactivating agent recovery back to the at least one reactor.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1A:
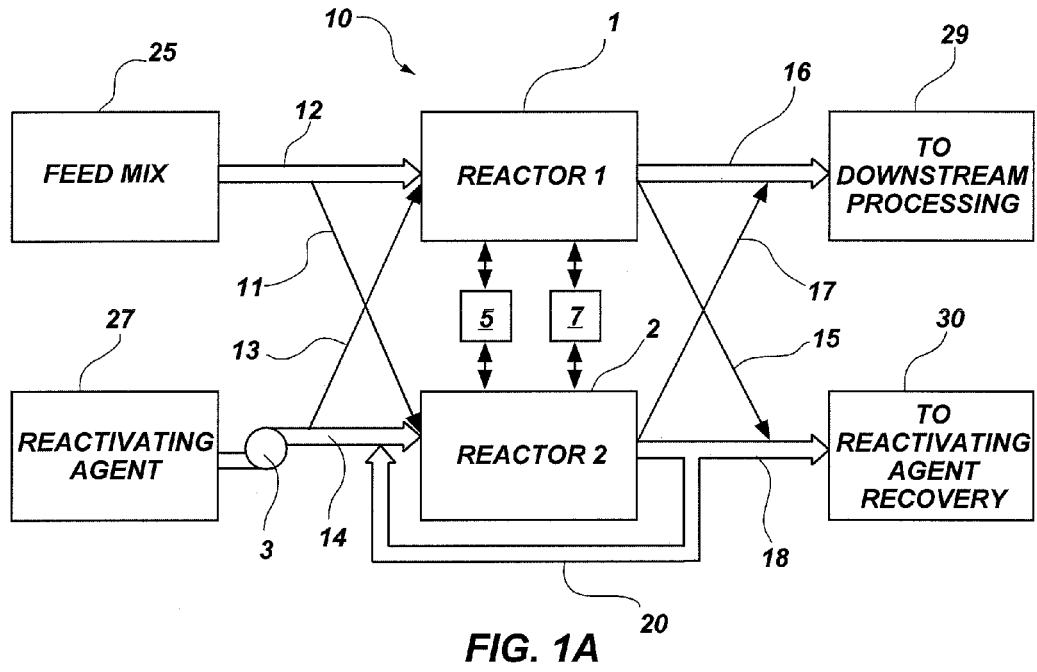
FIG. 1A schematically shows an embodiment of a two-column system in which the catalyst in reactor 2 is reactivated whereas alkylation takes place in reactor 1.

The present invention is directed to methods and systems for reactivating a partially or totally deactivated solid catalyst in such a way that the optimal pressure and temperature of the reaction conditions do not have to be altered to accommodate the reactivation process. The solid catalyst may be used to catalyze the primary reaction, such as an alkylation reaction or a nonalkylation reaction. While some of the embodiments described herein refer specifically to alkylation solid catalysts and alkylation reactors, it is understood that the reactors may include additional types of reactors and that the catalysts may include solid catalysts that catalyze nonalkylation reactions or alkylation reactions besides the alkylation reaction described herein. In other words, the methods and systems described herein are equally applicable to reactivating a solid catalyst used to catalyze an alkylation reaction or a nonalkylation or other catalytic reaction. The other catalytic reaction may include, but is not limited to a transesterification reaction, an esterification reaction, an oligomerization reaction, a polymerization reaction, or an isomerization reaction. The solid catalyst may be kept within a reactor during both the reaction and reactivation processes, or may be removed for the reactivation, depending on the particular piping and mechanical configuration employed. Catalyst reactivation according to this invention is accomplished by contacting the partially or totally deactivated solid catalyst with a fluid reactivating agent that can dissolve the fouling agents that deactivate the solid catalyst. The reactivating ability of the fluid reactivating agent of this invention is enhanced because the fluid reactivating agent is chosen so that it reacts with the fouling agents that deactivate the solid catalyst in a way that enhances desorption of the fouling agent from the catalyst surface, at or away from the reactive site. Removal of the reactivating fluid with the fouling agents and products of the reaction of the fluid reactivating agent with the fouling agents leads to a reactivated catalyst that can effectively be reused in subsequent reactions.

The reactivation methods according to the present invention do not interfere with the primary reaction itself. In some embodiments of the present invention, reactivation is performed while no reaction takes place in the reactor that contains at least a partially deactivated catalyst. In other embodiments of the present invention, the reactivation is performed while the catalyst is outside the reactor compartment in which the primary reaction takes place.

Reactivation of the catalyst outside the reactor is performed analogously as reactivation is carried out when the catalyst is within the reactor. However, reactivation of the catalyst outside the reactor involves the additional operations of removing the catalyst from and reinserting it into the reactor.

Reactivation of the catalyst in the reactor while no reaction takes place may be preferably accomplished according to the present invention with a swing column system that permits the controlled and independent direction of the flow of reactants and the flow of fluid reactivating agent. Schematic depictions of a swing column system 10 are shown in FIGS. 1A-2.

Figure 1B:
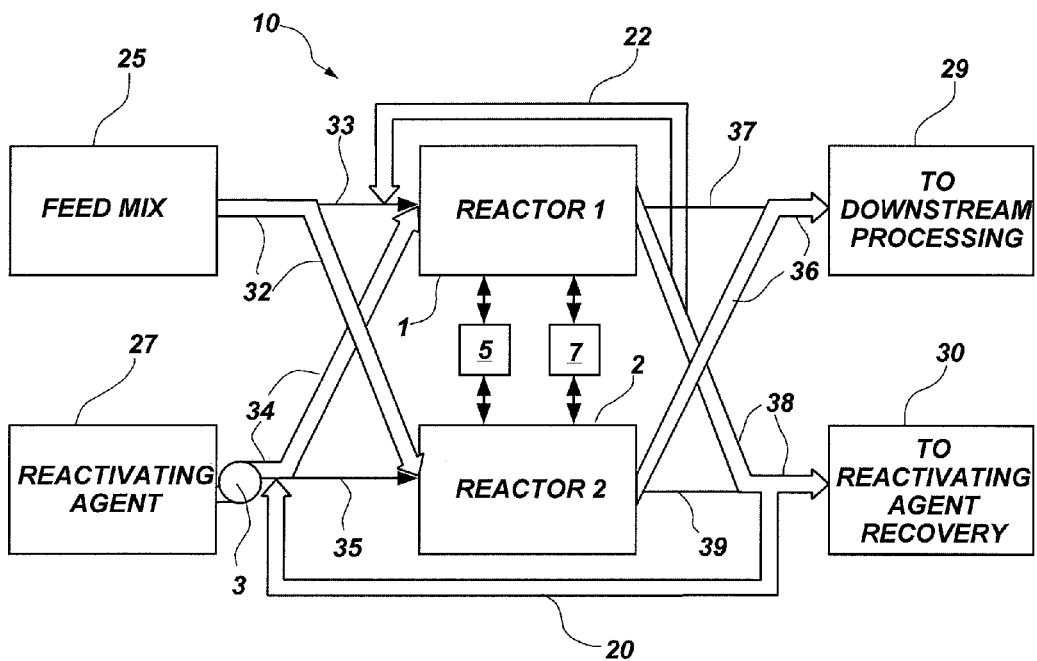
FIG. 1B schematically shows an embodiment of a two-column system in which the catalyst in reactor 1 is reactivated whereas alkylation takes place in reactor 2.
Figure 2:
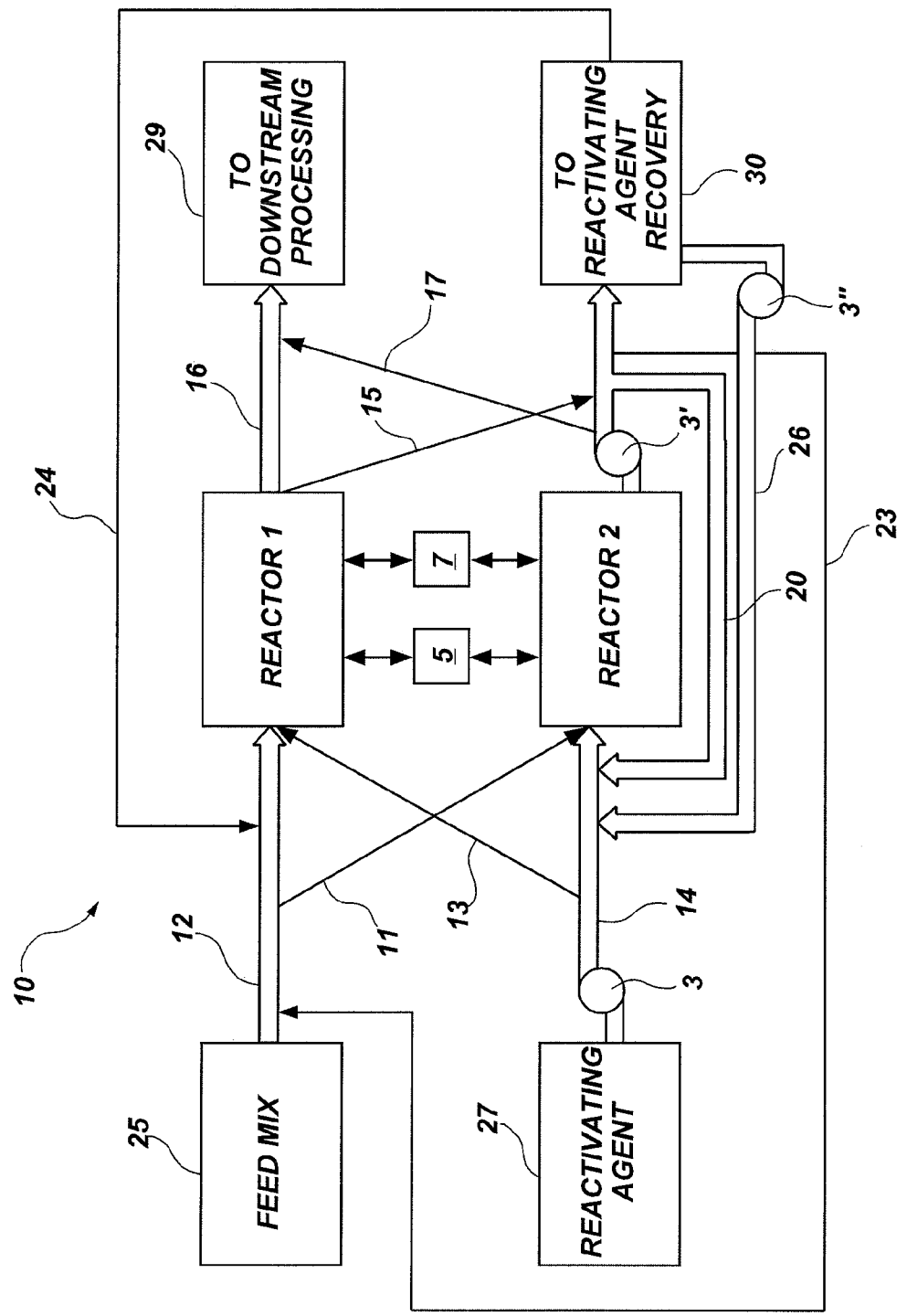
FIG. 2 schematically shows an embodiment of a two-column system in which contaminated reactivating agent is cleaned and recycled for use in the reactivation process as at least a portion of the feed mix or as the reactivating agent.

The embodiments of the swing column system shown in FIGS. 1A-2 may be extended to any number of reactors, even though the embodiments shown in FIGS. 1A-2 are depicted as a two-column system for the sake of simplicity and clarity. Implementation of the principles described herein regarding swing column systems may be extended to any number of reactors by one of ordinary skill in the art.

The diagrams in FIGS. 1A-2 show reactors 1 and 2 which are embodied by any model of suitable alkylation reactors. The reactors 1 and 2 are an example of means for holding at least one solid alkylation catalyst. It will be understood by those skilled in the art that a variety of reactor configurations may be utilized to accomplish this function.

Active flow lines in the embodiments sketched in FIGS. 1A-2 are represented by the thicker arrows. These active flow lines comprise lines 12, 14, 16, 18, and 20 in FIG. 1A; lines 32, 34, 36, 38, and 20 in FIG. 1B; and lines 12, 14, 16, 18, 20, 22, 24, and 26 in FIG. 2. Closed lines through which no flow is intended to circulate are represented in FIGS. 1A-2 by thinner lines. These closed lines comprise lines 11, 13, 15, and 17 in FIGS. 1A and 2 and lines 33, 35, 37, and 39 in FIG. 1B.

Feed mix 25 comprises the alkylation reactants or other reactants necessary to the primary reaction. Feed mix 25 is supplied in the embodiment shown in FIG. 1A to one reactor whereas fluid reactivating agent is supplied to another reactor, which contains at least partially deactivated alkylation catalyst. In some types of reactions, it is contemplated that the feed mix 25 and a fluid reactivating agent 27 may be the same chemical component. For sake of example only, in some reactions, the feed mix 25 and the fluid reactivating agent 27 may be isobutane. In the embodiment shown in FIG. 1A, feed mix 25 is supplied to reactor 1 whereas fluid reactivating agent 27 is supplied to reactor 2. Catalyst in reactor 1 is active enough as to be able to effectively catalyze alkylation with feed mix 25 supplied through active flow 12. The alkylate obtained thereby is transported by active flow 16 to downstream processing 29.

Fluid reactivating agent 27 is supplied through active flow line 14 in the embodiment shown in FIG. 1A to reactor 2 which contains at least partially deactivated alkylation catalyst. The active flow line 14 with at least one associated pumping device 3 is an example of means for directing the fluid reactivating agent 27 toward the catalyst. The pumping device 3 may be configured to direct the fluid reactivating agent 27 toward the reactor 2. In other words, the fluid reactivation agent 27 may be pumped towards the reactor 2 through active flow line 14 using the pumping device 3. The fluid reactivation agent 27 may flow over the solid catalyst in the reactor 2 to regenerate the solid catalyst. It will be understood by those skilled in the art that a variety of configurations of the pumping device 3 may be utilized to accomplish this function. For instance, the pumping device 3 may be a centrifugal pump or a positive displacement pump. Similarly, a pumping device (not shown) may be used to direct the feed mix 25 towards the reactor 1. In addition, pumping devices (not shown) may be used to direct the fluid reactivating agent 27 through active flow lines 16, 18 and/or 20. However, it is also contemplated that the feed mix 25 and fluid reactivation agent 27 may be transported through the system 10 without using pumps, such as by using a positive pressure generated upstream in the process through, for example, the use of compressed gases applied to fluid reactivating agent 27. In addition, a compressor, such as a gas compressor, may be used to transport the fluid reactivating agent 27.

The solid catalyst is reactivated by the fluid reactivating agent 27, which dissolves the fouling agents deposited in the solid catalyst and also reacts with some fouling agents to enhance the reactivation. A means for generating pressure and temperature conditions while the solid catalyst is in contact with the fluid reactivating agent in the absence of alkylation is provided such that the fluid reactivating agent 27 is of sufficient density to dissolve impurities and is a near-critical gas or near-critical liquid, or is at or above the critical point. It will be understood by those skilled in the art that a variety of pressure control devices 7 and temperature control devices 5 may be utilized to initiate and maintain the optimum pressure and temperature conditions during catalyst regeneration. The pressure control devices 7 and temperature control devices 5 may be associated with each of the reactors 1, 2.

The fluid reactivating agent 27, along with dissolved fouling agents and the products of the reaction of the fluid reactivating agent 27 with the fouling agents, may be transported through active flow line 18 to fluid reactivating agent recovery 30 with the option of directly recirculating or recycling such flow through line 20 back into reactor 2. The fouling agents may also be separated from the fluid reactivating agent in fluid reactivating agent recovery 30 before the fluid reactivating agent 27 is reused, as will be described in detail herein.

Because no alkylation takes place in reactor 2 while its catalyst is being reactivated, the reactivating conditions in reactor 2 may be chosen to optimize the reactivation process without interfering with the actual alkylation that takes place in reactor 1 and in any other additional reactor (not shown in FIG. 1A). Catalyst reactivation according to this embodiment may be performed at any desired stage in any cycle of the catalyst's performance. For example, alkylation may be run in reactor 2 until the catalyst contained therein is completely deactivated, or it may be run only up to the stage where the catalyst is deactivated to a determined extent.

When the solid catalyst in reactor 1 needs reactivation and the solid catalyst in reactor 2 is ready to effectively catalyze alkylation, the operation is performed as schematically shown in FIG. 1B. Feed mix 25 in FIG. 1B is supplied to reactor 2 through active flow line 32, whereas fluid reactivating agent 27 is supplied to reactor 1 through active flow line 34. Suitable valves (not shown) downstream in the respective flow paths from feed mix 25 and from fluid reactivating agent 27 may, as known to those of ordinary skill in the art, be used to selectively alter the flow paths between reactor 1 and reactor 2. The alkylate obtained in reactor 2 is transported through line 36 to downstream processing 29. On the other hand, the fluid reactivating agent 27, along with dissolved fouling agents and the products of any reaction of fouling agent with the fluid reactivating agent 27 from reactor 1, are transported by active flow line 38 to fluid reactivating agent recovery 30. Optionally, such flow may be recirculated through a line 22 associated with reactor 1. Again, suitable valves (not shown) may be used to selectively alter the flow paths downstream of reactors 1 and 2.

The number of reactors in the swing column system is chosen according to the relative duration of each of the alkylation and reactivation processes in the different reactors. For example, when catalyst reactivation is completed before the alkylation catalyst has become deactivated to an unacceptable extent, a plurality of alkylation reactors can be maintained in the swing column system while the catalyst in only a single reactor is being reactivated.

Since the swing column system 10 includes temperature control devices 5 and pressure control devices 7, the pressure and temperature conditions may be adjusted to optimize the alkylation reaction and/or the reactivation process. The alkylation reaction and reactivation process of the present invention may take place at the same pressure. Alkylation can take place at lower temperatures where the highly branched trimethylpentane products are favored. During catalyst reactivation, the temperature may be increased to optimize the removal of catalyst fouling agents. Reducing pressure swings simplifies flow processes, improves reliability, and reduces operating costs of a commercial unit.

The methods of this invention may be used to reactivate an alkylation catalyst regardless of the reactor type that is used for the actual alkylation process. In addition to swing column reactors, the methods of this invention can effectively be used to reactivate alkylation catalysts in conjunction with a variety of other reactor types as well. Such reactor types include, but are not necessarily limited to, packed bed systems, fluidized bed reactors, fixed bed reactors, and systems where the catalyst is physically moved through alkylation and reactivation zones within a single reactor or among several separate reactors, such as in continuous stirred tank reactors (CSTR). For example, when continuous stirred tank reactors are utilized, one reactor may be used to provide a reactivation zone for catalyst regeneration and another reactor may be used to provide an alkylation zone for performing alkylation reactions, with the catalyst physically moved therebetween.

In any reactor type, the methods of this invention may be implemented in conjunction with partial or total recycle of the reactivating reactor effluent to the reactor inlet.

It is believed that the fouling agents deactivating the solid catalyst include long chain hydrocarbons that have low volatility and high molar mass. Because of their low volatility, these fouling agents do not evaporate easily. Furthermore, these fouling agents diffuse poorly through the catalyst's pores because of their high molar mass. The fouling agents may also include lower molecular weight hydrocarbons, such as alkenes.

The mechanism whereby the fluid reactivating agent of this invention effectively removes the fouling agents from the solid catalyst appears to be complex. However, it is believed that the fluid reactivating agent may remove the fouling agents by a process that includes the reactive release of the fouling agents from the solid catalyst. It is believed that the fouling agents are deposited at the catalyst's active sites in the form of carbocations that interact with the catalyst's active sites. Since the fouling agents are carbocations, they may be hydrogen deficient and are stabilized by the surface of the solid catalyst. A fluid reactivating agent, such as isobutane, may lead to hydride transfer to the high molecular weight carbocation and its subsequent release from the catalyst active sites. The isobutane in turn forms a $C_4$-carbocation with the catalyst active site, activating the catalyst active site for subsequent alkylation once olefin is reintroduced to the reactor. This activation of the active site eliminates the induction period commonly seen with fresh alkylation catalyst, thus increasing the initial rate of the alkylation reactions.

In other words, the fouling agents on the solid catalyst may be hydrogen deficient and, as such, are stabilized by the surface of the solid catalyst. The fluid reactivating agent may provide a source of a hydride ion that is transferred to the fouling agents. The hydride ion may stabilize the fouling agents, which are then released from the solid catalyst. By releasing the fouling agents, the solid catalyst may be reactivated and reused in subsequent reactions. The reactivation process may be used to reactivate a solid catalyst deactivated by hydrogen deficient, fouling agents. The solid catalyst may be used to catalyze the primary reaction, such as an alkylation reaction or a nonalkylation or other catalytic reaction. The fluid reactivating agent used in the reactivation process may be selected depending on the solid catalyst that is used in the reaction and the type of reaction that is catalyzed.

In the present invention, a majority of the fouling agents are not removed from the solid catalyst by cracking or breaking the fouling agents into lower, molecular weight pieces that are volatile. Rather, the fouling agents released from the solid catalyst may have a molecular weight that is approximately equal to or greater than the molecular weight of the fouling agents deposited on the solid catalyst. For instance, during the alkylation reaction, the molecular weight of the fouling agents may be increased due to alkenes reacting and adding to the fouling agents. Therefore, when the hydride ion is transferred from the fluid reactivating agent 27 to the fouling agent, the molecular weight of the released fouling agents may be approximately equal to or greater than the molecular weight of the fouling agents deposited on the solid catalyst. Once the fouling agents are released from the solid catalyst, they may be dissolved in the fluid reactivating agent 27 and transported to the fluid reactivating agent recovery 30 for processing. While the majority of the fouling agents are removed in this manner, it is contemplated that a small portion of the fouling agents may be removed by cracking or breaking.

The reactive aspect of the reactivating function performed by embodiments of the fluid reactivating agent of this invention is consistent with the results obtained from reactivation with He, and independently with n-pentane. Less than 35% of the completely deactivated catalyst's activity is recovered in these reactivation processes. These percentages of recovery of less than 35% are believed to be due to high temperature cracking and volatilization or solubilization of the fouling agents by the non-reactive fluid reactivating agent, such as He or n-pentane. In contrast, up to 83% of the completely deactivated catalyst's activity can be recovered with a fluid reactivating agent according to this invention, such as supercritical isobutane. These results indicate that mere cracking and subsequent volatilization or dissolution of the fouling agents do not lead to the high reactivation effects achieved by embodiments of the present invention.

If the fluid reactivating agent has passed over the solid catalyst, the fluid reactivating agent may include at least a portion of the fouling agents that deactivated the solid catalyst. For convenience, the term "contaminated fluid reactivating agent" refers to the fluid reactivating agent after it has passed or flowed over the solid catalyst and includes dissolved fouling agents and products of any reaction of the fluid reactivating agent with the fouling agents. For instance, active flow line 18 may include contaminated fluid reactivating agent. Depending on the amount of fouling agents released from the solid catalyst, the contaminated fluid reactivating agent may include a low or a high concentration of the fouling agents. Before the contaminated fluid reactivating agent is reused, the fouling agents may be completely or partially removed from the fluid reactivating agent. For convenience, the term "clean fluid reactivating agent" refers to the fluid reactivating agent after at least a portion of the fouling agents has been removed. The clean fluid reactivating agent may be reused as the fluid reactivating agent 27 or, in certain circumstances, as at least a portion of the feed mix 25. For instance, when the fluid reactivating agent 27 and the feed mix 25 are identical or similar chemical components, the clean fluid reactivating agent may be recycled and reused as a constituent of the feed mix 25. By reusing the fluid reactivating agent, rather than discarding or otherwise disposing of it, the amount of fluid reactivating agent that must be purchased for reactivating the solid catalyst may be substantially reduced. In addition, energy consumption may be reduced because the fluid reactivating agent may be at an increased temperature or pressure after passing through the system 10. Therefore, the fluid reactivating agent may not need to be further heated or pressurized before recycling. It is also contemplated that if the fluid reactivating agent includes a sufficiently low concentration of the fouling agent after flowing over the solid catalyst, the fluid reactivating agent may be directly reused as the fluid reactivating agent 27 or as the feed mix 25. As shown in FIG. 2, the fluid reactivating agent 27 may be directly recirculated through lines 20, 23 without additional cleaning.

The fouling agents may be separated or removed from the contaminated fluid reactivating agent by separating or removing the fouling agents from the fluid reactivating agent in the fluid reactivating agent recovery 30. Separation techniques, such as adsorbing the fouling agents to a solid material, altering solubility properties of the fluid reactivating agent, or chemically reacting the fouling agents, may be used to separate the fouling agents from the fluid reactivating agent. The fouling agents may also be removed from the fluid reactivating agent by chemically reacting the fouling agents. In this situation, additional separation may not be required. The clean fluid reactivating agent may then be transported through lines 26 or 24 for use as additional reactivating agent 27 or, in some circumstances, as at least a portion or constituent of feed mix 25, respectively. For instance, when the reactivating agent 27 and the feed mix 25 are identical or similar chemical components, the clean fluid reactivating agent may be reused as the feed mix 25 or a constituent thereof. It is also contemplated that a first portion of the clean fluid reactivating agent may be used as reactivating agent 27 while a second portion of the clean fluid reactivating agent is used as the feed mix 25.

As shown in FIG. 2, a first pumping device 3 may be used to direct the fluid reactivating agent toward the solid catalyst. The temperature and pressure control devices 5, 7 may be used to initiate and maintain the temperature and pressure conditions while the solid catalyst is in contact with the fluid reactivating agent so that the fluid reactivating agent is at or above a critical point of the fluid reactivating agent and is of sufficient density to dissolve the impurities. A second pumping device 3' may be configured and operably coupled to direct contaminated fluid reactivating agent to the reactivating agent recovery 30. A third pumping device 3" may be configured and operably coupled to recirculate clean fluid reactivating agent from the reactivating agent recovery 30 through line 26 to the at least one reactor 2.

In the separation technique, the fluid reactivating agent may be in its supercritical phase or in a noncritical phase, such as in the gas phase or liquid phase, depending on the temperature and pressure conditions used in the separation. For instance, the fluid reactivating agent may be in the noncritical phase if the temperature or pressure is below the critical point of the fluid reactivating agent. The temperature or pressure conditions may also be reduced to a level that remains above the critical point but still provides a change in the properties of the fluid reactivating agent.

In one embodiment, the fouling agents may be separated from the fluid reactivating agent by passing the contaminated fluid reactivating agent over a solid material to which the fouling agents adsorb. The contaminated fluid reactivating agent may be flowed over the adsorbent solid material in its supercritical phase, liquid phase, or gas phase. Adsorbent solid materials are known in the art. Therefore, a choice of an appropriate solid material is within the skill of one of ordinary skill in the art. The adsorbent solid material may include, but is not limited to, alumina, molecular sieves, or activated carbon and may adsorb either high molecular weight or low molecular weight fouling agents. The clean fluid reactivating agent may be reused as additional fluid reactivating agent 27 or as at least a portion of feed mix 25 in certain circumstances. For instance, when the fluid reactivating agent 27 and the feed mix 25 are identical or similar chemical components, the clean fluid reactivating agent may be reused as the feed mix 25 or a constituent thereof.

In another embodiment, the fouling agents may be removed by changing the solubility properties of the fluid reactivating agent. For instance, changing the pressure or temperature conditions may change the solubility of the fouling agents in the fluid reactivating agent, which causes the fouling agents to precipitate. For sake of example only, decreasing the pressure of the fluid reactivating agent causes the density of the fluid reactivating agent to decrease. The solubility of the fouling agents in the fluid reactivating agent also decreases and, therefore, the fouling agents may precipitate from the fluid reactivating agent and are easily removed. Similarly, if the temperature of the fluid reactivating agent is increased, the density of the fluid reactivating agent decreases and the fouling agents may become less soluble in the fluid reactivating agent. This separation technique may be used to remove high molecular weight fouling agents.

In another embodiment, a chemical reaction of the fouling agents may be used to separate or remove the fouling agents from the fluid reactivating agent. The chemical reaction may be catalyzed by a catalyst to form products that are easily separated from the fluid reactivating agent. To distinguish this type of catalyst from the solid catalyst, the former catalyst is referred to herein as a "recycling" catalyst. The contaminated fluid reactivating agent is passed over the recycling catalyst so that the fouling agents may be converted to products that are easily separated from the fluid reactivating agent or to products that do not interfere with the primary reaction or regeneration. The recycling catalyst may be selected depending on the fouling agents present in the contaminated fluid reactivating agent and the reaction to be catalyzed. For sake of example only, if the fouling agents are alkenes, the recycling catalyst may be selected to catalyze the reaction of the alkenes to alkanes (a hydrogenation reaction). However, it is understood that recycling catalysts capable of catalyzing additional reactions may also be used. The recycling catalyst may be present on a support material, such as silica or alumina. This recycling catalyst may be selected based on the fouling agents present in the contaminated fluid reactivating agent and the reaction to be catalyzed. The recycling catalyst may include, but is not limited to, platinum, palladium, and nickel.

The recycling catalyst may be located in the reactor proximate to the solid catalyst, such as in an internal catalyst bed. It is also contemplated that a multi-functional catalyst exhibiting the catalytic activity of both the solid catalyst and the recycling catalyst may be used. In addition, the recycling catalyst may be located in a catalyst bed that is external to, or separate from, the solid catalyst. In this situation, two such catalyst beds may be in the same reactor or in different reactors. For instance, the recycling catalyst may be present in one reactor and used to remove the fouling agents from the contaminated fluid reactivating agent while the solid catalyst may be used in a second reactor to catalyze the desired reaction.

Other separation techniques known in the art may also be used to clean the fluid reactivating agent. For instance, clean fluid reactivating agent may be produced by distilling the fluid reactivating agent from the fouling agents.

A combination of separation techniques may be used to remove the fouling agents to achieve a desired purity in the clean fluid reactivating agent. It is also contemplated that a combination of separation techniques may be used to remove different fouling agents. Depending on the types of fouling agents present in the fluid reactivating agent, a first separation technique may be used to remove one type of fouling agent while a second separation technique may be used to remove a second type of fouling agent. For instance, high molecular weight fouling agents may be removed from the fluid reactivating agent by changing the properties of the fluid reactivating agent while lower molecular weight fouling agents may be removed by a solid phase adsorption technique.

Some conventional processes for treating catalysts rely on an initial washing of the deactivated catalyst with liquid isobutane, and subsequently these processes rely on a gas such as hydrogen, typically in the presence of at least one metal such as Pt, Pd, and Ni, to reactivate the catalyst. Isobutane is an embodiment of a fluid reactivating agent according to the present invention, and it is relied on for the primary reactivating function. Furthermore, a fluid reactivating agent according to this invention may optionally be mixed with at least one gas, such as hydrogen or oxygen, because the fluid reactivating agent under supercritical conditions dissolves such gas. The added gas or a mixture thereof then supplements the reactivating effects of the fluid reactivating agent of this invention. Embodiments of this invention that include a gas dissolved in the fluid reactivating agent are preferably used in the presence of at least a metal such as Pt, Pd, and Ni.

Figure 3:
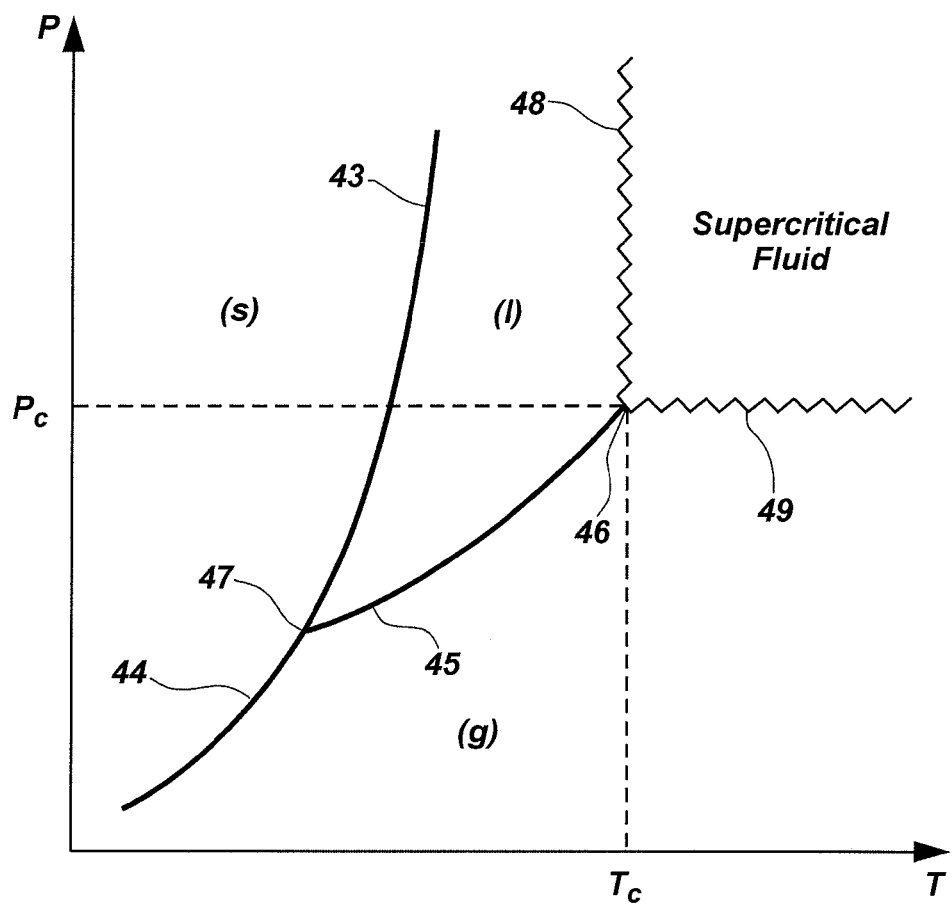
FIG. 3 schematically shows relevant features of a one-component system P-T phase diagram.

FIG. 3 schematically shows a one-component system phase diagram that is used hereinbelow to describe the pressure and temperature conditions for the catalyst reactivation methods according to this invention. It is understood that the phase diagram shown in FIG. 3 is merely a sketch representing qualitatively basic features of a phase diagram of a one-component system. This diagram is merely used for the purpose of introducing the terminology that will be adopted hereinbelow to characterize the pressure and temperature conditions at which the catalyst reactivation is performed according to the present invention.

Lines 43, 44 and 45 in the pressure (P)-temperature (T) diagram sketched in FIG. 3 represent respectively the solid-liquid, solid-gas and liquid-gas equilibrium lines. Point 47 is called the triple point and point 46 is called the critical point, which is defined by a critical pressure ($P_c$) and by a critical temperature ($T_c$).

The region to the right of the solid-liquid equilibrium line 43 and above the liquid-gas equilibrium line 45 for temperatures less than $T_c$ represents states of the fluid system which is in the liquid phase (l). The region to the right of the solid-gas equilibrium line 44 and below the liquid-gas equilibrium line 45 for temperatures below $T_c$ represents states of the fluid system which is in the gas phase (g). The region to the left of the solid-gas equilibrium line 44 and to the left of the solid-liquid equilibrium line 43 represents states of the system which is in a solid phase (s). Finally, the region for temperatures greater than $T_c$ and pressures greater than $P_c$ represents states of the fluid system that are supercritical. This supercritical region of the phase diagram is partially delineated with wavy lines 48 and 49, which are merely visual aids and which, in contrast with lines 43, 44, and 45, do not represent first order phase transitions. The term "near-critical" (NC) liquid is used herein to refer to all pressures corresponding to a liquid phase in the temperature range of about 0.9-1 $T_c$, where $T_c$ is referred to on an absolute temperature scale such as Kelvin (K) or Rankine (R). The term "critical" is used herein to characterize a pressure and a temperature that are equal to $P_c$ and $T_c$, respectively. The term "supercritical" is used herein to refer to a pressure and a temperature which are greater than $P_c$ and $T_c$, respectively, and "SCF" is used as an acronym for "supercritical fluid."

Characteristics of a supercritical fluid include transport properties that are more similar to those of a gas and density that is more similar to that of a liquid. For example, a supercritical fluid typically has a viscosity that is closer to that of a gas than to the liquid viscosity. High density is a desirable property when the fluid is utilized for dissolving other substances. The near-critical (NC) gas region of the phase diagram that is of interest in the context of this invention is the range of pressures and temperatures for a fluid which is of sufficient density as to effectively dissolve and/or transport catalyst fouling agents and the products of any reaction of the fluid reactivating agent with catalyst fouling agents, where an NC gas is defined as the fluid existing in its gas phase in the range of about 0.1-1 $P_c$, where $P_c$ is referred to on an absolute pressure scale, for temperatures at least about 0.9 $T_c$.

It has been discovered in the context of this invention that solid alkylation catalyst reactivation can be achieved by contacting the at least partially deactivated catalyst with a fluid reactivation agent at certain temperatures and pressures. These pressures and temperatures are such that the fluid reactivating agent is maintained in a fluid state and of sufficient density so that the catalyst fouling agents and products of any reaction of fouling agents with the fluid reactivating agent can be dissolved in the fluid reactivating agent. The pressure should be such that the fluid reactivating agent is a dense fluid, such as a dense supercritical fluid, a dense critical fluid, a near-critical liquid, or a dense near-critical gas. The temperature should be such that the fluid reactivating agent's density has not decreased so much that the fluid reactivating agent can no longer effectively dissolve the catalyst fouling agents and products of any reaction of fouling agents with the fluid reactivating agent.

In terms of the critical temperature $T_c$ and critical pressure $P_c$ of the fluid reactivating agent, this is achieved within a temperature range that encompasses near-critical and critical temperatures, such as temperatures of at least about 0.9 $T_c$ and within a pressure range that encompasses near-critical and critical pressures, such as pressures that are at least about 0.1 $P_c$. The pressure should be sufficiently high within practical limits so that the fluid is of sufficient density to have the desired solvent properties at a given temperature.

In the context of the present invention the fluid reactivating agent is preferably at a pressure in the range of about 0.1 $P_c$ to about 10 $P_c$, more preferably about 0.1 $P_c$ to about 8 $P_c$, and most preferably about 1 $P_c$ to about 6 $P_c$; and at a temperature preferably in the range of about 0.9 $T_c$ to about 1.3 $T_c$, and more preferably about 0.95 $T_c$ to about 1.2 $T_c$.

When the pressure and temperature conditions are such that the fluid reactivating agent is a near-critical liquid, a pressure sufficient to maintain the fluid reactivating agent in a liquid phase is utilized, with a temperature of at least about 0.9 $T_c$, and preferably a temperature in the range of about 0.9 $T_c$ to about 1 $T_c$. When the pressure and temperature conditions are such that the fluid reactivating agent is a near-critical gas, the fluid reactivating agent is preferably at a pressure in the range of about 0.1 $P_c$ to about 1 $P_c$.

When the pressure and temperature conditions are such that the fluid reactivating agent is a critical fluid, the fluid reactivating agent is at a pressure equal to $P_c$ and at a temperature equal to $T_c$. When the pressure and temperature conditions are such that the fluid reactivating agent is a supercritical fluid, the fluid reactivating agent is at a pressure greater than $P_c$ and at a temperature greater than $T_c$. At supercritical conditions, the fluid reactivating agent is preferably at a pressure in the range of about 1 $P_c$ to about 8 $P_c$, and at a temperature preferably in the range of about 1 $T_c$ to about 1.3 $T_c$.

Wavy lines 48 and 49 in FIG. 3 indicate that the pressure and temperature conditions for the reactivating process according to the present invention do not necessarily have to be confined to the supercritical fluid region of the phase diagram. Instead, the pressure and temperature conditions extend, as noted above, outside the supercritical fluid region for the reactivating agent.

A reactivating agent in the context of this invention is understood to be a compound capable of dissolving some or all of the fouling agents in a solid catalyst. The reactivating agent also reacts with some or all of the fouling agents. A preferred fluid reactivating agent in the context of this invention is a branched paraffin containing at least one tertiary carbon (a carbon atom single-bonded to three other carbon atoms). For example, isobutane has effectively been used in the context of this invention as a good fluid reactivating agent. Another fluid reactivating agent in the context of this invention is isopentane. Still another embodiment of the fluid reactivating agent within the scope of this invention is a mixture of isobutane and isopentane. Yet another embodiment is the use as fluid reactivating agent of additional compounds that contain at least one tertiary carbon, such as 2,3-dimethylbutane; 2- and 3-methylpentanes; 2,3- and 2,4-dimethylpentanes; 2- and 3-methylhexanes; 2,3-, 2,4-, 2,5-, and 3,4-dimethylhexanes; 2,3,4-trimethylhexane; and the like. As illustrated above, these compounds may contain more than one tertiary carbon atom. Compounds such as straight-chain hydrocarbons that can be isomerized over the catalyst to compounds containing tertiary carbon atoms are also included as embodiments of the present invention. Some examples of isomerizable compounds, the listing herein of which does not exclude others, include n-butane which can isomerize to isobutane, and n-pentane which can isomerize to isopentane. Other useful compounds include reactive or isomerizable/non-reactive fluid reactivating agent compounds that do not contain tertiary carbons, but are capable of hydride transfer reactions, such as toluene, benzene, ethylbenzene, or other aromatic compounds. Further useful compounds for the fluid reactivating agent include fluid solvent compounds which can react with fouling agents in manners different than hydride transfer. Some nonlimiting examples of such compounds include ionic compounds, polar compounds, or other compounds capable of reducing the affinity of bound carbocations for a solid catalyst active site, and/or removing by reaction all or part of the fouling agent from the catalyst active site. Various mixtures of the above compounds can also be utilized as desired.

The terms "branched paraffin" refer herein to at least one branched paraffin. Consequently, these terms encompass embodiments such as one single branched paraffin, a mixture of branched paraffins, and mixtures containing at least one branched paraffin, which perform as the fluid reactivating agent of this invention that is embodied by at least one branched paraffin. Other embodiments of the fluid reactivating agent of this invention include mixtures of isoparaffins and hydrocarbons. Still other embodiments of the fluid reactivating agent of this invention include mixtures of a hydrocarbon with at least one gas such as hydrogen and oxygen. Examples of these embodiments include a mixture of isobutane and hydrogen, a mixture of isopentane and hydrogen, a mixture of isobutane, isopentane and hydrogen, and mixtures of any of the above example compounds or similar compounds with hydrogen.

The choice of the specific fluid reactivating agent depends in part on the pressure and temperature conditions at which the catalyst reactivation is to be performed. Known correlations between the number of carbon atoms of isoparaffins, easily derivable from tables of critical constants, can be readily employed to choose a specific hydrocarbon or hydrocarbon mixture as the fluid reactivating agent. For example, as shown in Table 1, the critical pressure decreases as the number of carbon atoms increases in the series including isobutane, isopentane, and 2,3-dimethylbutane or 2-methylpentane. In contrast, the critical temperature increases as the number of carbon atoms for the same compounds increases.

TABLE 1

| Hydrocarbon | $T_c$/° C. | $P_c$/atm |
| --- | --- | --- |
| $C_4H_{10}$, isobutane | 134.7 | 35.9 |
| $C_5H_{12}$, isopentane | 187.8 | 32.9 |
| $C_6H_{14}$, 2,3-dimethylbutane | 226.8 | 30.9 |
| 2-methylpentane | 334.3 | 30.0 |

The temperature and pressure conditions of the fluid reactivating agent such as isobutane employed in a method for reactivating a solid alkylation catalyst according to the invention are such that the temperature is preferably in the range of about 94° C. to about 250° C., and more preferably about 150° C. to about 210° C., and the pressure is preferably in the range of from about 100 psig to about 10,000 psig, such as from about 200 psig to about 5000 psig.

The catalyst to be reactivated by the methods of this invention may be any of the catalysts that are known to be effective in alkylation reactions. The fluid reactivating agent is such that it can penetrate into the channels or other voids or regions where the catalyst's deactivated sites are located. This is determined by the size and shape of the channels, voids or other spaces defined by the structure of the catalyst. As discussed above, the size and dimensions of species that are to effectively interact with the fouling agents that occupy the active sites of catalysts of varying structures are known, and thus the appropriate fluid reactivating agent can be chosen for each solid alkylation catalyst.

The present invention further provides the benefit of reducing or eliminating the need for oxidative regeneration of catalysts, thereby maintaining catalyst activity for longer periods of time which reduces the frequency of catalyst replacement and the accompanying cost.

As previously mentioned, the reactivation process may be used to reactivate solid catalysts that are deactivated with hydrogen deficient fouling agents. The solid catalyst may have been used to catalyze a primary reaction other than the alkylation reaction previously described. For instance, the solid catalyst may have been used to catalyze a nonalkylation reaction including, but not limited to, a transesterification reaction, an esterification reaction, an oligomerization reaction, a polymerization reaction, or an isomerization reaction. The solid catalyst may also be used to catalyze an alkylation reaction other than the alkylation of isobutane, such as the alkylation of an aromatic compound or the alkylation of an isoparaffin compound other than isobutane. The fouling agents deactivating the solid catalyst may be hydrogen deficient compounds having high molecular weights, low molecular weights, or a mixture of high and low molecular weights. The fluid reactivating agent that is effective to remove the fouling agents may be selected based on the type of solid catalyst used and the type of reaction for which the solid catalyst is used. The solid catalyst may include an acid functionality or a base functionality, as known in the art. The solid catalysts may include, but are not limited to, the solid catalysts previously described. Preferably, the catalyst is an acid catalyst.

For sake of example only, an alkylation reaction of toluene with ethylene may be catalyzed by the solid catalyst. To reactivate the solid catalyst, the fluid reactivating agent may include toluene or a mixture of toluene and additional solvents. In addition, the oligomerization of ethylene to form butene, hexene, octene (or higher alkenes) may be catalyzed by the solid catalyst. The solid catalyst may be reactivated using isobutane as the fluid reactivating agent. The isomerization of butane, pentane, hexane (or higher analogs) may also be catalyzed by the solid catalyst. After the isomerization reaction, the solid catalyst may be reactivated using pentane, hexane, 2-methylpentane, or 2-methylhexane as the fluid reactivating agent.

It is also contemplated that the reactivation process may be used to reactivate liquid catalysts that are deactivated with fouling agents. Liquid catalysts are known in the art to catalyze many reactions, such as an alkylation reaction, a Friedel-Crafts alkylation reaction, or an acylation reaction. The liquid catalyst may include, but is not limited to, an ionic liquid, a liquid acid, or a liquid base. The ionic liquid may be a salt that exists as a liquid at ambient temperature. The ionic liquid may have an organic nitrogen-containing heterocyclic cation and an inorganic anion, such as $BF_4^-$, $PF_6^-$, $SbF_6^-$, $CF_3SO_3^-$, $CuCl_2^-$, $AlCl_4^-$, $AlBr_4^-$, $AlI_4^-$, $AlCl_3Et^-$, $NO_3^-$, $NO_2^-$, or $SO_4^-$. For instance, the organic nitrogen-containing heterocyclic cation may be an imidazolium cation, such as 1-butyl-3-methylimidazolium or 1-ethyl-3-methylimiidazolium. The liquid acid may include, but is not limited to, an acid halide (Lewis acid), a metal alkyl, a metal alkoxide, a protic acid (Brønsted acid), or a superacid. For instance, sulfuric acid ("$H_2SO_4$"), hydrofluoric acid ("HF"), $AlCl_3$, or $AlBr_3$ may be used as the liquid acid. The liquid base may include a hydroxide of an alkali metal, an oxide of an alkaline earth metal, or a hydroxide of an alkaline earth metal. For instance, sodium hydroxide (NaOH) or potassium hydroxide (KOH) may be used.

The liquid catalyst may have been used to catalyze a primary reaction, such as an alkylation reaction or a nonalkylation or other catalytic reaction. The nonalkylation or other catalytic reaction may include, but is not limited to, a transesterification reaction, an esterification reaction, an oligomerization reaction, a polymerization reaction, or an isomerization reaction. The liquid catalyst may be reactivated using the fluid reactivating agent, as previously described. In addition to using a reactive supercritical fluid, such as isobutane or isopentane, the fluid reactivating agent used to reactivate the liquid catalyst may be a non-reactive supercritical fluid, such as supercritical carbon dioxide, methane, ethane, propane, or butane.

The reactivation process may be performed at a moderate temperature that does not damage the solid catalyst. This temperature may vary depending on the reaction catalyzed and the properties of the fluid reactivating agent. Preferably, the temperature ranges from approximately 0° C. to approximately 500° C., such as from approximately 100° C. to approximately 300° C.

What is claimed is:

1. A system for reactivating a catalyst, comprising:
    at least one reactor configured to hold at least one catalyst at least partially deactivated by fouling agents;
    a first pumping device operably coupled to direct a fluid reactivating agent into contact with the at least one catalyst in the at least one reactor, wherein the fluid reactivating agent comprises a source of hydride ions and is capable of reacting with impurities comprising at least one fouling agent;
    control devices configured to generate pressure and temperature conditions in the at least one reactor while the at least one catalyst is in contact with the fluid reactivating agent to maintain the fluid reactivating agent at or above a critical point of the fluid reactivating agent;
    a second pumping device operably coupled to a line configured to direct contaminated fluid reactivating agent to a reactivating agent recovery, the contaminated fluid reactivating agent including the fluid reactivating agent and the at least one fouling agent; and
    a third pumping device operably coupled to a line configured to recirculate clean fluid reactivating agent from the reactivating agent recovery to the at least one reactor.

2. The system of claim 1, wherein the at least one catalyst comprises at least one solid catalyst or at least one liquid catalyst.

3. The system of claim 1, wherein the at least one reactor comprises at least a first reactor and a second reactor, the first and second reactors configured in a swing column apparatus to permit controlled and independent direction of the flow of reactants and the flow of the fluid reactivating agent.

4. The system of claim 1, wherein the at least one reactor comprises at least a first reactor and a second reactor, the at least a first and a second reactors configured as continuous stirred tank reactors to provide a reactivation zone for regeneration of the at least one catalyst within the first reactor and to provide a reaction zone for an alkylation reaction, a transesterification reaction, an esterification reaction, an oligomerization reaction, a polymerization reaction, or an isomerization reaction within the second reactor.

5. The system of claim 1, wherein the control devices are configured to adjust the pressure and temperature conditions in the at least one reactor to maintain the fluid reactivating agent at a near-critical liquid, or in a critical or a supercritical phase.

6. The system of claim 1, wherein the control devices are configured to adjust the pressure and temperature conditions in the at least one reactor such that the fluid reactivating agent is a near-critical gas, or in the critical or supercritical phase.

7. A system for reactivating a catalyst, comprising:
    at least one reactor configured to perform an alkylation reaction by contacting a catalyst with an alkylation reactant to produce reaction products and an at least partially deactivated catalyst comprising at least one fouling agent;
    at least another reactor configured to contact the at least partially deactivated catalyst with a fluid reactivating agent comprising a source of hydride ions and configured to generate pressure and temperature conditions in the at least another reactor to maintain the fluid reactivating agent at or above the critical point thereof;
    at least one flow path configured to supply a feed mix comprising the alkylation reactant to one of the at least one reactor and the at least another reactor;
    at least another flow path configured to supply the fluid reactivating agent to one of the least one reactor and the at least another reactor; and
    a device configured for selectively altering the at least one flow path and the at least another flow path between the at least one reactor and the at least another reactor.

8. The system of claim 7, further comprising a device for generating pressure and temperature conditions in the at least one reactor while the catalyst is in contact with the fluid reactivating agent.

9. The system of claim 7, wherein the device configured for selectively altering the at least one flow path and the at least another flow path between the at least one reactor and the at least another reactor comprises a valve in the at least one flow path and another valve in the at least another flow path.

10. The system of claim 7, further comprising a recovery location for removing the at least one fouling agent from the fluid reactivating agent.

11. The system of claim 10, further comprising a flow path configured to deliver the fluid reactivating agent from the recovery location to at least one of the at least one reactor and the at least another reactor.

12. A system for reactivating a catalyst, comprising:
    at least one reactor configured to hold at least one catalyst at least partially deactivated by fouling agents;
    a first pumping device for directing a fluid reactivating agent comprising a source of hydride ions to the at least one catalyst;
    control devices for generating pressure and temperature conditions in the at least one reactor while the at least one catalyst is in contact with the fluid reactivating agent to maintain the fluid reactivating agent is maintained at or above a critical point of the fluid reactivating agent;
    a second pumping device operably coupled to a line for directing contaminated fluid reactivating agent to a reactivating agent recovery, the contaminated fluid reactivating agent including the fluid reactivating agent and the fouling agents; and a third pumping device operably coupled to a line for recirculating clean fluid reactivating agent from the reactivating agent recovery to the at least one reactor.

13. The system of claim 12, wherein the at least one reactor comprises at least a first reactor and a second reactor, the first and second reactors configured in a swing column apparatus to permit controlled and independent direction of the flow of reactants and the flow of the fluid reactivating agent.

14. The system of claim 12, wherein the control devices are configured to adjust the pressure and temperature conditions in the at least one reactor to transfer hydride ions from the fluid reactivating agent to the fouling agents.

* * * * *

UNITED STATES PATENT AND TRADEMARK OFFICE
CERTIFICATE OF CORRECTION

PATENT NO. : 7,670,568 B2
APPLICATION NO. : 12/165301
DATED : March 2, 2010
INVENTOR(S) : Daniel M. Ginosar et al.

Page 1 of 2

It is certified that error appears in the above-identified patent and that said Letters Patent is hereby corrected as shown below:

In the drawings:
In FIG. 2    immediately below reference numeral "17" insert reference numeral --18-- and associated lead line directed toward thick arrow

Please replace the following FIG. 2 with the amended drawing:

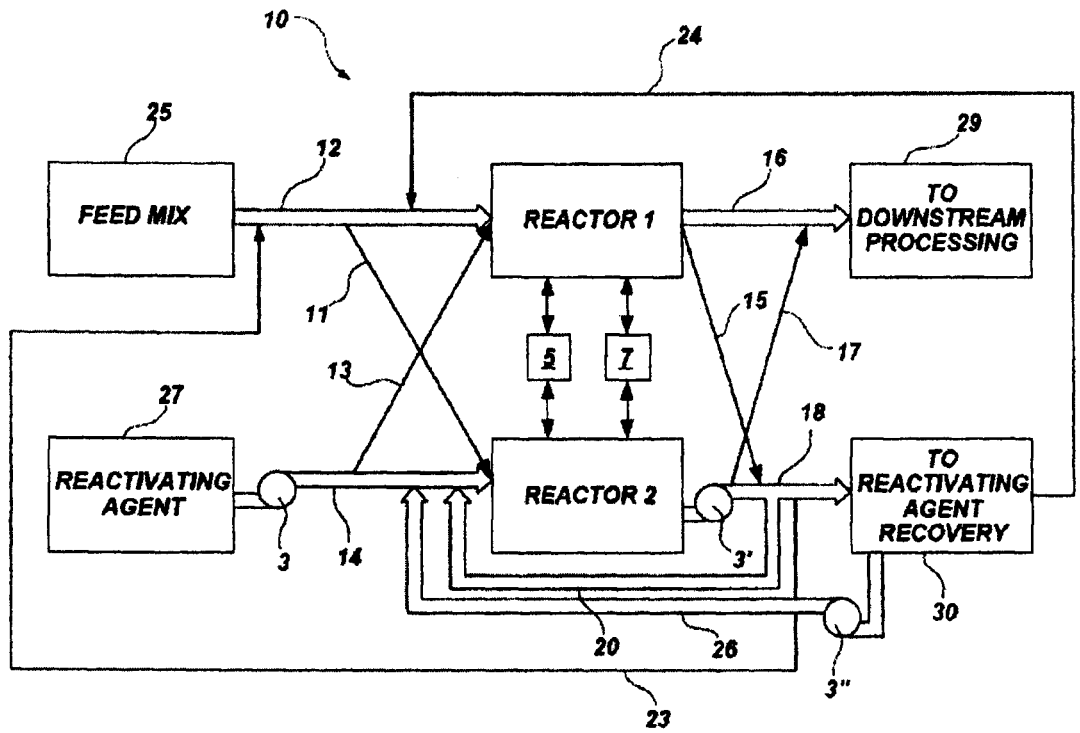

FIG. 2

Signed and Sealed this
Nineteenth Day of July, 2011

David J. Kappos
*Director of the United States Patent and Trademark Office*

CERTIFICATE OF CORRECTION (continued)
U.S. Pat. No. 7,670,568 B2

In the specification:

| | | |
|---|---|---|
| COLUMN 5 | LINE 26 | change "reference in made" to --reference is made-- |
| COLUMN 11 | LINES 4-5 | change "38, and 20 in FIG. 1B;" to --38, 20, and 22 in FIG. 1B;-- and change "lines 12, 14, 16, 18, 20, 22, 24," to --lines 12, 14, 16, 18, 20, 24,-- |
| COLUMN 12 | LINE 7 | change "reactivating agent" to --reactivating agent 27-- |
| COLUMN 21 | LINE 6 | change "1-ethyl-3-methylimiidazolium." to --1-ethyl-3-methylimidazolium.-- |

In the claims:

| | | | |
|---|---|---|---|
| CLAIM 4 | COLUMN 22 | LINE 1 | change "a first and a second reactors" to --a first and a second reactor-- |
| CLAIM 7 | COLUMN 22 | LINE 33 | change "the least one reactor" to --the at least one reactor-- |
| CLAIM 12 | COLUMN 22 | LINE 64 | change "agent is maintained at" to --agent at--- |
| CLAIM 13 | COLUMN 23 | LINE 8 | change "the first" to --the at least a first-- |
| CLAIM 13 | COLUMN 24 | LINE 1 | change "and second reactors" to --and a second reactor-- |